United States Patent [19]

Schoen

[11] Patent Number: 4,948,656

[45] Date of Patent: Aug. 14, 1990

[54] LAMINATE INCLUDING SEALING LIQUID BETWEEN FACING SURFACES OF LAMINATIONS

[75] Inventor: Jerry W. Schoen, Hamilton, Ohio

[73] Assignee: Armco Advanced Materials Corporation, Lyndora, Pa.

[21] Appl. No.: 375,237

[22] Filed: Jul. 3, 1989

Related U.S. Application Data

[62] Division of Ser. No. 43,077, Apr. 27, 1987, Pat. No. 4,882,834.

[51] Int. Cl.⁵ .............................................. H01F 27/24
[52] U.S. Cl. ..................................... 428/215; 428/467; 428/457; 428/440; 428/433; 428/497; 428/450; 336/234; 336/219; 29/609
[58] Field of Search ............... 428/467, 457, 440, 433, 428/497, 215, 450; 336/234, 219; 29/609

[56] References Cited

U.S. PATENT DOCUMENTS

| | | | |
|---|---|---|---|
| 790,452 | 5/1905 | Nenzel | 428/467 |
| 1,932,308 | 10/1933 | Freeland | 336/234 |
| 2,904,875 | 9/1959 | Trigg et al. | 336/234 |
| 2,914,840 | 12/1959 | Damiano | 29/155.57 |
| 3,013,907 | 12/1961 | Baird et al. | 428/467 |
| 3,301,699 | 1/1967 | Mozzi | 428/467 |
| 3,538,601 | 11/1970 | Nerot et al. | 29/602.1 |
| 3,652,355 | 3/1972 | Herrick | 156/151 |
| 3,819,427 | 6/1974 | Baesch | 148/122 |
| 3,948,786 | 4/1976 | Evans | 252/63.5 |
| 4,277,530 | 7/1981 | Miller | 428/216 |
| 4,565,746 | 1/1986 | Hayase | 336/234 |
| 4,618,377 | 10/1986 | Nakamura et al. | 148/6.15 R |
| 4,734,975 | 4/1988 | Ballard et al. | 29/606 |

FOREIGN PATENT DOCUMENTS

| | | |
|---|---|---|
| 3029058 | 2/1982 | Fed. Rep. of Germany . |
| 0017968 | 2/1978 | Japan ................................ 336/234 |
| 147516 | 5/1986 | Japan . |
| 157736 | 8/1978 | Netherlands . |

OTHER PUBLICATIONS

J. W. Schoen et al., 1986 ASM Materials Conference, Domain Refinement of Oriented Electrical Steel: from Early Beginnings to an Emerged Technology.

Primary Examiner—Ellis P. Robinson
Assistant Examiner—William P. Watkins
Attorney, Agent, or Firm—R. J. Bunyard; L. A. Fillnow; R. H. Johnson

[57] ABSTRACT

Method for forming a laminate and a product formed thereof. A thin layer of oil is applied to a facing surface of at least one a plurality of adjacent laminations. The laminations are passed between a pair of rollers which apply sufficient pressure to remove excess oil between the facing surfaces. The air between the facing surfaces is displaced and the remaining oil forms a seal to prevent reentry of the air. The laminate is tightly held together to permit handling or fabrication without delamination.

3 Claims, 2 Drawing Sheets

LAMINATE INCLUDING SEALING LIQUID BETWEEN FACING SURFACES OF LAMINATIONS

This is a divisional of copening application Ser. No. 07/043,077 filed on 4-27-87 now U.S. Pat. No. 4,882,834, issued 11-28-89.

BACKGROUND OF THE INVENTION

This invention relates to a method of forming a laminate and an improved laminated core formed therefrom. More particularly, the invention relates to applying a liquid to the facing surfaces of laminations and applying sufficient pressure to the laminations to remove excess liquid and displace the air between the facing surfaces.

There are several applications such as electric power transformers, motors, electronics and catalytic converters employing thin gauge laminations. Thin gauge electrical steel or amorphous laminations for electrical applications reduce magnetically induced eddy currents by reducing the cross-sectional area through which those currents may flow. Grain oriented steel laminations have a thickness less than 0.5 mm, typically in the range of 0.18 to 0.35 mm. Amorphous laminations typically have a thickness of about 0.02 to 0.05 mm.

It is well known the above type electrical devices are more efficient when the thickness of the lamination is decreased with the lower limit for lamination thicknesses determined by manufacturing considerations. However, reducing the lamination thickness has undesirable effects on handling and fabrication productivity. Handling tissue-like thin laminations is a problem because the laminations are fragile and prone to damage during handling. The very thinness of the laminations reduces the productivity during processing and fabrication, making the product more labor intensive to utilize.

The prior art discloses adhesives, varnishes, oxides or mixtures thereof which may be applied to the surfaces of laminations so that several of the laminations can be bonded (or laminated) together for simultaneous processing. Processing a laminate greatly increases productivity and diminishes handling problems since the laminate thicker and more rigid than a single lamination.

Nevertheless, there are several disadvantages when using adhesives, varnishes or oxides to bond laminations. To develop a good bond between laminations, the bonding agent normally must be applied as a relatively thick layer. Creating space between adjacent laminations which are wound or stacked into laminated articles is undesirable when used in electrical applications. This relationship of laminations and spaces involves a space factor which is the ratio of the volume of a stack of laminations under a given pressure to that of the solid materal of the same mass. Thus, the space factor indicates the deficiency of effective volume due to the surface roughness of the laminations, lack of flatness of the laminations, or the presence of adhesive, coating, oxide and the like in between the adjacent surfaces of the laminations. A space factor of at least 90%, preferably greater than 95%, is desired for electric power transformers. Using a bonding agent that decreases the space factor is undesirable.

More recent prior art discloses adhesives which allegedly develop good bonds when applied as relatively thin layers and avoid decreasing the space factor below an acceptable level. However, a thin layer of adhesive tends to shrink when cured. Such a shrinkage, particularly for thin metal laminations may strain or induce stress into the laminations. Soft magnetic materials such as amorphous metal and grain oriented laminations are extremely sensitive to compressive stress. Induced compressive stress causes electrical power to be expended in the form of heat, i.e., core loss.

Another disadvantage when using chemical bonding is that the laminations become rigidly connected. If the laminate is wound into a coil such as around a mandrel having a small radius of curvature, the outer surface of a lamination must travel a greater distance than the inside surface of the lamination. Since the adjacent laminations are rigdly connected by a bonding agent, the laminations cannot move laterally relative to each other. As discussed above for chemically bonded electrical laminations, winding such a laminate into a coil may induce stress thereby increasing core losses of the laminate.

U.S. Pat. No. 4,277,530 teaches adhesive bonding of two or more sheets of electrical steel having thicknesses less than about 0.5 mm. The adhesive disclosed allegedly overcomes several of the problems associated with previously used adhesives. For example, a good bond is obtained between sheets when using thin glue lines so that a high stacking (space) factor can be obtained without inducing compressive stresses which act parallel to the rolling direction causing degradation of both magnetostriction and core loss characteristics. Instantaneous bonding is achieved at a curing temperature below about 400° C. It is disclosed that adhesively bonded laminated articles: were less than 5% thicker than the total thickness of individual panels, showed an increase in core losses for electrical sheets of 5 to 16% above that for pairs of sheets before adhesive bonding, and the minimum roll radius to prevent damage when rewinding into a coil is 11 inches (280 mm).

Certain grains of electrical steels are produced with reduced core loss achieved by inducing strain into the surface of a metal lamination such as thermal strain by rapid localized heating using a laser. The effect of thermal strain can be reduced if the laminations are exposed to elevated temperature. For example, a paper presented by Schoen et al. in October, 1986 to the ASM Materials Conference entitled *Domain Refinement of Oriented Electrical Steel: From Early Beginnings to an Emerged Technology* discloses that the effect of strain domain refinement is reduced when the strained metal lamination is exposed to temperatures of about 400° C. or more. A further disadvantage when using chemical bonding is that heat may be required to cure the bonding agent. Curing may require additional heat treating equipment or a separate heat treating step prior to final fabrication of the laminate. Adhesives may require curing temperatures as high as 400° C. while ceramic bonds may require temperatures as high as 900° C. Consequently, the maximum benefit of this domain refinement technique cannot be preserved if the metal laminations are bonded together with an adhesive or ceramic requiring an elevated curing temperature.

Another disadvantage with chemical or ceramic bonding is that the bonding layers tend to be brittle. If chemically bonded laminations must be processed through cutting, punching or corrugating operations, the bonding layer may fracture causing the laminations to delaminate. Ceramic bonds may be broken by simply recoiling a laminate.

A laminate may be formed into cores by winding or punching and stacking the cores being used in an environment other than ambient air. For example, electric power transformers are frequently immersed in a dielectric cooling oil which may have a temperature of about 100° C. The bonding agent must not only be stable at an elevated temperature but also must be chemically compatible with the oils over an extended period of time.

Accordingly, there remains a need for an improved technique for forming a laminate which can be easily handled without damage or delamination during fabrication. Furthermore, there remains a need for a laminate having no increase of spacing between adjacent laminations and a laminate whose laminations can remain free from stress or strain during fabrication.

I have discovered that a laminate can be formed and will resist separation indefinitely by applying a liquid of an appropriate viscosity to the facing surfaces of laminations. Sufficient pressure is applied to the laminations so that the facing surfaces are brought into intimate contact with each other and air between the facing surfaces is displaced by the liquid as excess liquid is removed from between the facing surfaces. The liquid remaining between the facing surfaces forms a seal preventing reentry of the air which enables the laminate to resist separation during subsequent processing and fabrication. The laminate formed has no increase in the space between its laminations and no induced stress in its laminations.

BRIEF SUMMARY OF THE INVENTION

This invention relates to a method of forming a laminate and an improved laminated core formed therefrom. A liquid is applied to a facing surface of at least one of a plurality of laminations. Pressure is applied to the laminations to bring the facing surfaces of the laminations into intimate contact with each other, to remove excess liquid, and to displace air from between the facing surfaces. The remaining liquid between the facing surfaces forms a seal to prevent reentry of the air.

It is a principal object to my invention to form a laminate that resists separation having no decrease in the space factor.

Another object is to form a laminate which can be fabricated without delamination.

Advantages of my invention include reduction in manufacturing costs and production of fabricated cores whose laminations are free from strain and induced stress.

The above and other objects, features and advantages of my invention will become apparent upon consideration of the detailed description and appended drawing.

DETAILED DESCRIPTION OF THE PREFERRED EMBODIMENT

Figure 1:
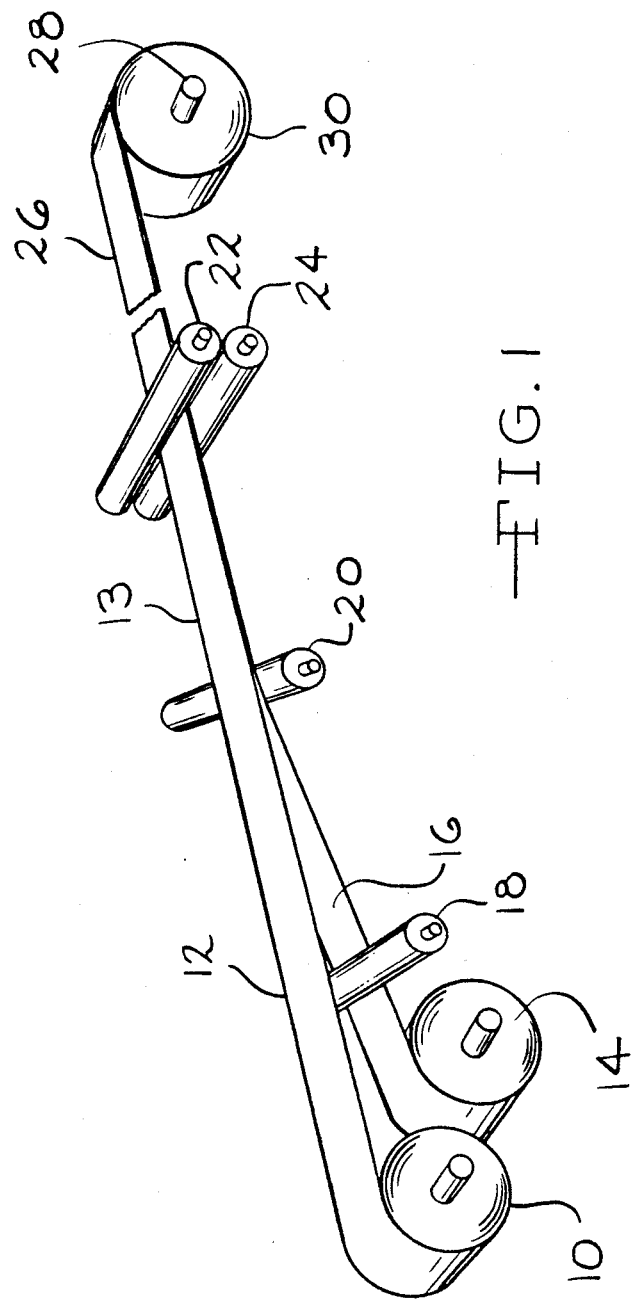
FIG. 1 is a schematic showing two strips moving along a feedpath being laminated together by a pair of sealing rollers and being wound into a coil.

Referring to FIG. 1, reference numeral 12 denotes a strip being uncoiled from a coil 10 and fed at a predetermined speed along a feedpath 13. Another strip 16 is being fed at the same speed from a coil 14 under an oiling roller 18. Strip 16 is brought together with strip 12 by a change of direction roller 20.

For my invention, it will be understood that a lamination is meant to include sheet, strip, foil, ribbon and the like. Preferably, the lamination will include cold reduced or cast steel and amorphous base metal having a thickness of less than about 0.5 mm. A more preferred lamination includes grain oriented steel having a glass insulative coating on both sides of the lamination with a total thickness of less than about 0.35 mm. U.S. Pat. No. 3,948,786—Evans, which is incorporated herein by reference, discloses grain oriented steel having $Mg-PO_4$ glass insulative coatings.

Oiling roller 18 applies a thin coating of oil over the entire top surface of strip 16. Strips 12 and 16 pass between a pair of sealing rollers 22 and 24. Rollers 22 and 24 apply sufficient pressure to strips 12 and 16 so that the adjacent (facing) surfaces of strips 12 and 16 are brought into intimate contact with each other and the oil substantially displaces all the air between the facing surfaces to form a laminate 26. Laminate 26 is wound around a mandrel 28 forming a coil 30.

The clearance between rollers 22 and 24 preferably should not be less than the combined thicknesses of strips 12 and 16. For grain oriented strips, rollers 22 and 24 must apply sufficient pressure to remove excess oil and prevent entrapped air without inducing stress into strips 12 and 16.

FIG. 1 illustrates how an oil film is applied by roller 18 only to the top surface of strip 16. It will be understood by those skilled in the art roller 18 could also be used to apply oil to the bottom surface of strip 12. Alternatively, a fine mist of oil could be sprayed on either or both of the facing surfaces of strips 12 and 16. Depending on the equipment available, the number of strips simultaneously fed along feedpath 13 and type of material being laminated, it may be advantageous to apply oil to the strip during a previous processing operation.

Figure 2:
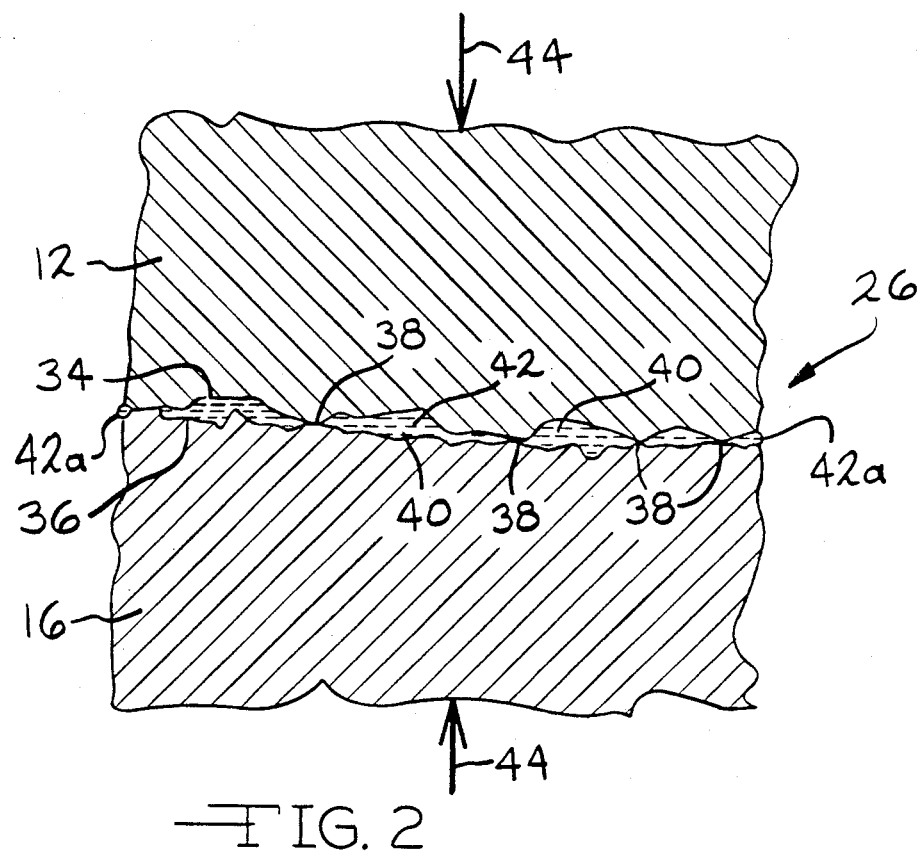
FIG. 2 shows an enlarged fragmentary cross-section view of laminated strips of my invention.

FIG. 2 illustrates an enlarged fragmentary cross-section view of laminate 26. The planar surfaces of metallic strips are not perfectly flat and have a somewhat roughened surface. This means a facing surface 34 of strip 12 will not be in continuous contact with an adjacent facing surface 36 of strip 16. The facing surfaces 34 and 36 engage each other at point contacts 38. As strips 12 and 16 are brought into contact with each other by rollers 22 and 24, void areas 40 representing non-contact points betweens surfaces 34 and 36 are completely filled with oil 42. The separation between surfaces 34 and 36 at non-contact points, i.e., void areas 40, will be less than about 0.005 mm. Air is displaced as excess oil is squeezed from between surfaces 34 and 36. Oil 42a near the sides of strips 12 and 16 between surfaces 34 and 36 prevents reentry of the air. Accordingly, strips 12 and 16 are tenaciously held together. Not being bound by theory, it is believed the laminate is tightly held together by a pressure differential existing between the pressure remaining in the oil filled voids 40 and the ambient atmospheric pressure surrounding laminate 26. In other words, strips 12 and 16 resist delamination since the interlaminar pressure upon separation would decrease below ambient atmospheric pressure pushing against the outside surfaces of laminate 26 as illustrated by arrows 44.

Figure 3:
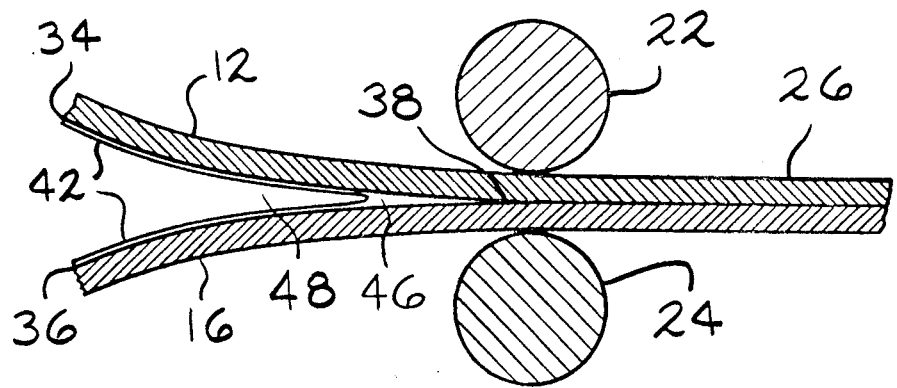
FIG. 3 shows an enlarged longitudinal section view of two strips being pressed together according to my invention.

This is further illustrated in FIG. 3. Facing surfaces 34 and 36 of strips 12 and 16 respectively have a thin layer of oil 42. Strips 12 and 16 are being fed from left to right through the bite of rollers 22 and 24. As rollers 22 and 24 bring surfaces 34 and 36 into intimate contact with each other, a meniscus 46 of oil 42 proceeds ahead of the engaging surfaces, displacing air 48.

It will be understood by those skilled in the art, liquids other than oil could be used as the sealing liquid. The important considerations are that the sealing liquid adequately wets the surfaces of the laminations, is compatible with the environment in which the laminated structure will be used, and has the necessary viscosity.

I have determined experimentally that a variety of low viscosity media perform well as a sealing liquid. Cores used as transformers in electric power transmission are frequently permanently immersed in and cooled by a transformer oil. Transformer oil is defined in ASTM D3487-82a. Using this oil as the sealing media is particularly advantageous in that it is compatible with the transformer oil. For some applications, the formed core may receive a final heat treatment before its end use. For those heat treated cores where carbon in a hydrocarbon based sealing liquid could contaminate the strip base metal, i.e. grain oriented steel, a synthetic non-carbonaceous oil could be used as the sealing liquid.

By way of example, I formed laminates using a silicone synthetic oil and a mineral oil as the sealing media. Grain oriented electrical steel strips having a CARLITE-3 insulative coating on each side having a total strip thickness of about 0.18 mm, a length of about 305 mm, and a width of about 30 mm were used. The specific density and specific viscosity at 24° C. of the silicone oil were 0.98 g/cc and 40 cP respectively. Corresponding properties of the mineral oil were 0.88 g/cc and 4 cP. The properties of both oils were as specified in ASTM D3487-82a. Laminates were formed by applying a film of oil to a planar surface of a first strip and then laying a second strip adjacent the oiled surface of the first strip. The two strips were passed between a pair of rollers and squeezed together using pressure sufficient to force out air and excess oil, but not to deform or induce stress into the strips. Excess oil squeezed from between the facing surfaces was wiped away.

Test results for both oils are shown in Tables I and II. Core loss permeability and space factor were tested in accordance with ASTM A343-82 and A719-75 respectively. The "Before Laminating" results were performed before the strips were oiled.

Using the silicone oil (Table I), the weight increase was very slight, about 0.16% of the prelaminated weight. Based on the prelaminated weights, the laminating process diminished the space factor by only 0.14%. However, based on the laminated weights, the laminating process increased the space factor by 0.02%. The effect of the laminating treatment on the core loss was negligible. Using the prelaminated weights the core loss was unaffected. Using the laminated weights, there is a slight increase in the core loss (a 0.4% increase) which is not the result of the laminating treatment. The as-laminated test weight was increased, resulting in the test being preformed at a higher induction. The laminates could be easily handled with no slippage or delamination.

TABLE I

| 0.18 mm ORIENTED ELECTRICAL STEEL LAMINATED WITH SILICONE-BASED OIL | | | | | | | | |
|---|---|---|---|---|---|---|---|---|
| | Before Laminating | | After Laminating | | | | | |
| | | | Based on Prelaminated Wts. | | | Based on Actual Laminate Wts. | | |
| | Sample 1 | Sample 2 | Sample 1 | Sample 2 | diff* | Sample 1 | Sample 2 | diff* |
| Sample weight (g): | 410.20 | 409.40 | | | | 410.80 | 410.10 | 0.16% |
| Number of Strips | 32 | 32 | 16 | 16 | | 16 | 16 | |
| Sample thickness (mm): | 0.183 | 0.183 | | | | 0.366 | 0.366 | |
| Space Factor: | 96.20% | 96.39% | 96.09% | 96.23% | −0.14% | 96.23% | 96.39% | +0.02% |
| 17 KG 60 Hz Core Loss (W/kg): | 1.340 | 1.327 | 1.344 | 1.322 | 0.00% | 1.349 | 1.329 | 0.41% |
| Permeability at H = 796 A/m (G): | 1847 | 1848 | 1849 | 1849 | +2 pts | 1846 | 1847 | −1 pts |

"diff" = average difference of (laminated) - (prelaminated) test data.*

Using the lower viscosity mineral oil (Table II), the results were only slightly different. Based on the prelaminated and laminated weights, the space factor increased by 0.11% and 0.28%, respectively. Using the prelaminated and laminated weights, the core loss increased only slightly, about 0.08% and 0.66%, respectively.

TABLE II

| 0.18 mm ORIENTED ELECTRICAL STEEL LAMINATED WITH MINERAL OIL | | | | | | | | |
|---|---|---|---|---|---|---|---|---|
| | Before Laminating | | After Laminating | | | | | |
| | | | Based on Prelaminated Wts. | | | Based on Actual Laminate Wts. | | |
| | Sample 3 | Sample 4 | Sample 3 | Sample 4 | diff* | Sample 3 | Sample 4 | diff |
| Sample weight (g): | 411.60 | 409.30 | | | | 410.80 | 410.10 | 0.00% |
| Number of Strips | 32 | 32 | 16 | 16 | | 16 | 16 | |
| Sample thickness (mm): | 0.184 | 0.183 | | | | 0.366 | 0.366 | |
| Space Factor: | 96.13% | 96.12% | 96.16% | 96.30% | +0.11% | 96.35% | 96.47% | 0.28% |
| 17 KG 60 Hz Core Loss (W/kg): | 1.347 | 1.322 | 1.344 | 1.327 | 0.08% | 1.351 | 1.336 | 0.66% |
| Permeability at H = 796 A/m (G): | 1847 | 1849 | 1849 | 1850 | +2 pts | 1846 | 1847 | −2 pts |

"diff" = average difference of (laminated) - (prelaminated) test data.*

It should be noted that the changes reported in Tables I and II are very small and within the test error of the equipment and techniques used to make the determinations. Unlike the prior art bonded laminates, the decrease in space factor and increase in core loss for my laminate were substantially less than 1%.

Viscosity of a liquid is a measurement of its resistance to flow due to the attraction between molecules of the liquid. The greater the attractive force, the slower the liquid is to flow. The viscosity of the sealing media used is important because it effects the fluid flow rate of meniscus 46 between facing surfaces 34 and 36 when joined together by rollers 22 and 24 as illustrated in FIG. 3.

Laminating quality using a variety of sealing media having room temperature (24° C.) viscosities in the range of 2-515 cP was evaluated. The laminating technique was the same as described above except the strips were 0.26 mm thick, 305 mm long, and 100 mm wide. The results are shown in Table III.

TABLE III
EFFECT OF LIQUID VISCOSITY ON QUALITY OF LAMINATED STRIPS

| Media | Fluid Type | Measured Viscosity at 24° C. | Laminate Adherence | Bendability | Resistance to Shear/Slippage |
|---|---|---|---|---|---|
| methyl alcohol | organic alcohol | 2 cP | yes | excellent | excellent |
| water | inorganic | 4 cP | yes | excellent | excellent |
| mineral-type transformer oil | organic oil | 4 cP | yes | excellent | excellent |
| surfactant | chemical | 18 cP | yes | excellent | excellent |
| silicone-type transformer oil | synthetic oil | 40 cP | yes | excellent | excellent |
| mineral oil | viscosity tes standard | 50 cP | yes | excellent | excellent |
| surfactant | chemical | 83 cP | yes | excellent | marginal |
| surfactant | chemical | 214 cP | yes | excellent | poor |
| surfactant | chemical | 515 cP | yes | good | very poor |

The bendability and adherence of the laminates formed using all the sealing media evaluated were acceptable. However, the resistance to shear/slippage between adjacent laminations of the laminate was marginal as the viscosity increased to above about 80 cP. This suggests excessively viscous sealing media do not flow well from between facing surfaces when adjacent laminations are joined together preventing intimate contact of the facing surfaces. Heating the sealing media above room temperature is a practical means of decreasing the viscosity of the media for use in the laminating process of the present invention.

An important disadvantage when using chemical or ceramic bonding to laminate grain oriented steel or amorphous laminations is that the laminations are rigidly connected together. Irrecoverable damage to the material occurs when the elastic yield limit of the material is exceeded when winding the laminate into a core or coil having a mandrel of too small a radius of curvature. I have determined that a pair of 7-mil thickness (0.18 mm) laminations can be laminated and wound into a coil having an inner diameter of as little as 7 inches (178 mm) without exceeding the lamination elastic limit. Unlike prior art bonded laminations, the sealing medium of my laminate permits lateral movement or slippage between the laminations. In some situations, it may be desirable to delaminate the laminate prior to further processing. This is not possible with prior art chemical or ceramic bonded laminates. The laminations of my laminate can be separated if necessary. Such separated laminations could even be relaminated without the application of additional sealing liquid by applying pressure to the laminations to displace the air between the facing surfaces.

While only one embodiment of my invention has been described, it will be understood various modifications may be made to it without departing from the spirit and scope of it. For example, various sealing liquids may be used so long as they are compatible with the environment within which the laminate is to be used and have the necessary viscosity to form a seal when applied in very thin layers. Two or more laminations may be laminated simultaneously using various means to apply the sealing liquid to the facing surfaces of at least one of the laminations. One or both surfaces of the laminations may have previously applied coatings such as metallic or glass insulative coatings. The laminate may be wound into a core, formed into a stacked core of cut laminates or otherwise fabricated. Therefore, the limits of my invention should be determined from the appended claims.

I claim:

1. A metallic core comprising:
   at least one laminate,
   said laminate including at least two laminations having facing surfaces, said laminations having a thickness of less than about 0.5 mm,
   said laminations being in point contact with each other over the entire area of said facing surfaces,
   an oil between said facing surfaces wherein said oil has a viscosity at 24° C. of no more than about 80 cp,
   said oil completely filling the voids between said contact points over the entire area of said facing surfaces,
   said oil forming a seal to prevent reentry of air previously displaced from between said facing surfaces when said facing surfaces are brought into contact with one another, whereby the core is formed without delamination of said laminations of said laminate.

2. A core as set forth in claim 1 wherein said laminations are grain oriented steel and said surfaces include a glass insulating coating.

3. A core as set forth in claim 1 wherein the core is a wound electrical transformer.

* * * * *